United States Patent [19]

Brister

[11] Patent Number: 4,492,095
[45] Date of Patent: Jan. 8, 1985

[54] APPARATUS AND METHOD FOR FORMING A TEMPORARY PLUG IN A FLUID CONDUIT

[75] Inventor: Beryle D. Brister, Amarillo, Tex.

[73] Assignee: Brister, Incorporated, Amarillo, Tex.

[21] Appl. No.: 559,787

[22] Filed: Dec. 9, 1983

Related U.S. Application Data

[62] Division of Ser. No. 328,029, Dec. 8, 1981, Pat. No. 4,428,204.

[51] Int. Cl.³ ............................................. F25D 3/00
[52] U.S. Cl. .................................. 62/293; 62/514 R; 137/13; 138/93; 138/97
[58] Field of Search ............... 62/293, 514 R; 138/89, 138/93, 97; 137/13

[56] References Cited

U.S. PATENT DOCUMENTS

| | | | |
|---|---|---|---|
| 3,310,615 | 3/1967 | Bender | 138/89 |
| 3,926,006 | 12/1975 | Brooks et al. | 62/293 |
| 4,112,706 | 9/1978 | Brister | 62/293 |
| 4,291,727 | 9/1981 | Yie et al. | 138/93 |

OTHER PUBLICATIONS

IRIS-STOP Flow Stopping Equipment-ALH Systems Limited-England.

Primary Examiner—Ronald C. Capossela
Attorney, Agent, or Firm—Hubbard, Thurman, Turner & Tucker

[57] ABSTRACT

A flow stopping plug is formed in a conduit such as a fluid transmission pipeline by tapping a relatively small hole in the side of the pipe directly adjacent the desired location of the plug and inserting a flexible bag through the hole using a radially extendable bag insertion apparatus having a tube containing the bag initially in a collapsed or folded condition. The bag is connected to a conduit assembly which provides for filling the bag with water in the deployed position inside the pipe. After the bag is filled with water, a freezing process is carried out preferably using a cryogenic fluid which is circulated around the exterior of the pipe section directly adjacent to the bag. The conduit assembly connected to the bag may be placed in communication with a source of heating fluid for melting the ice plug formed within the bag after completion of the work process in connection with which the ice plug was deployed. In an alternate embodiment of the conduit system, a conduit loop or coil is provided which is disposed inside the flexible bag and is adapted to alternately be in communication with a source of cryogenic fluid and the heating fluid to provide for accelerating the freezing and melting process.

14 Claims, 7 Drawing Figures

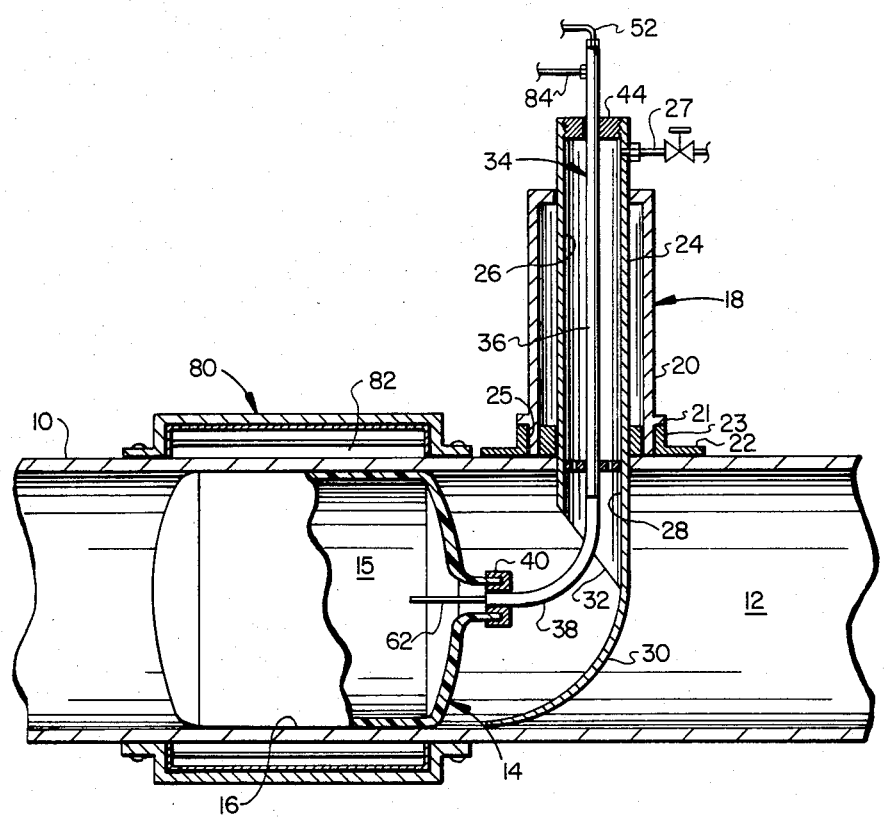
FIG. 1
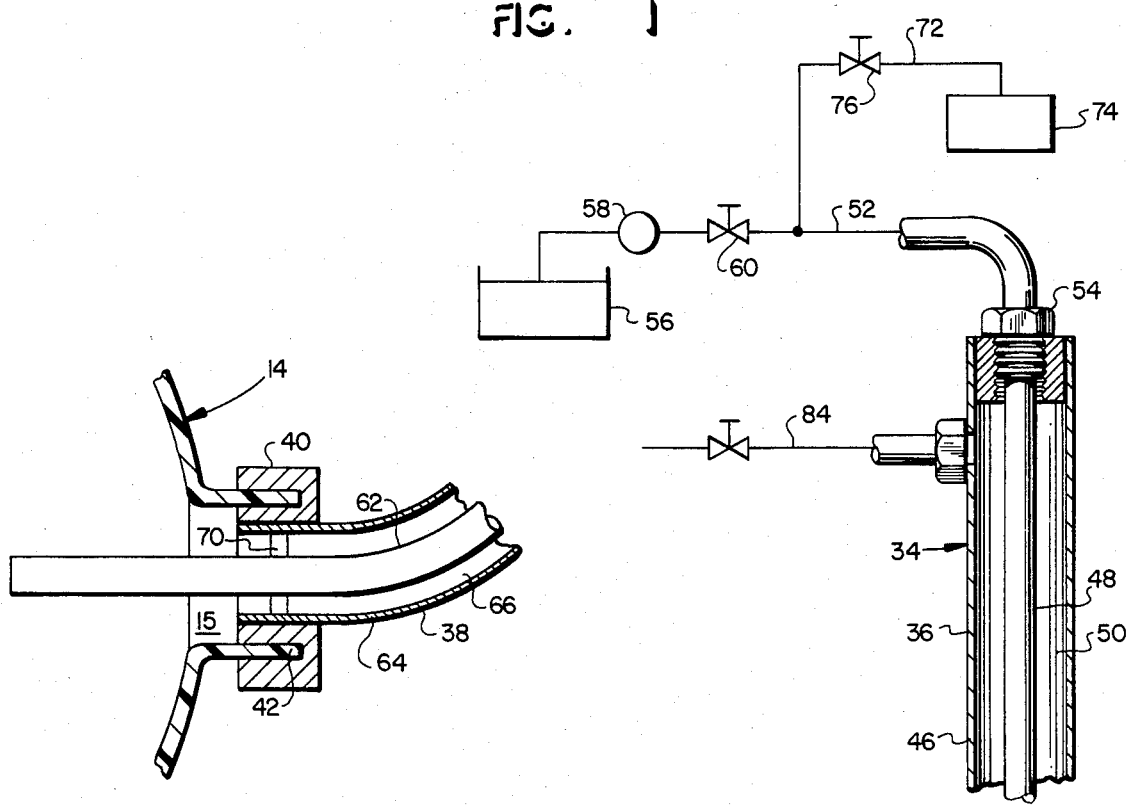
FIG. 2
FIG. 3

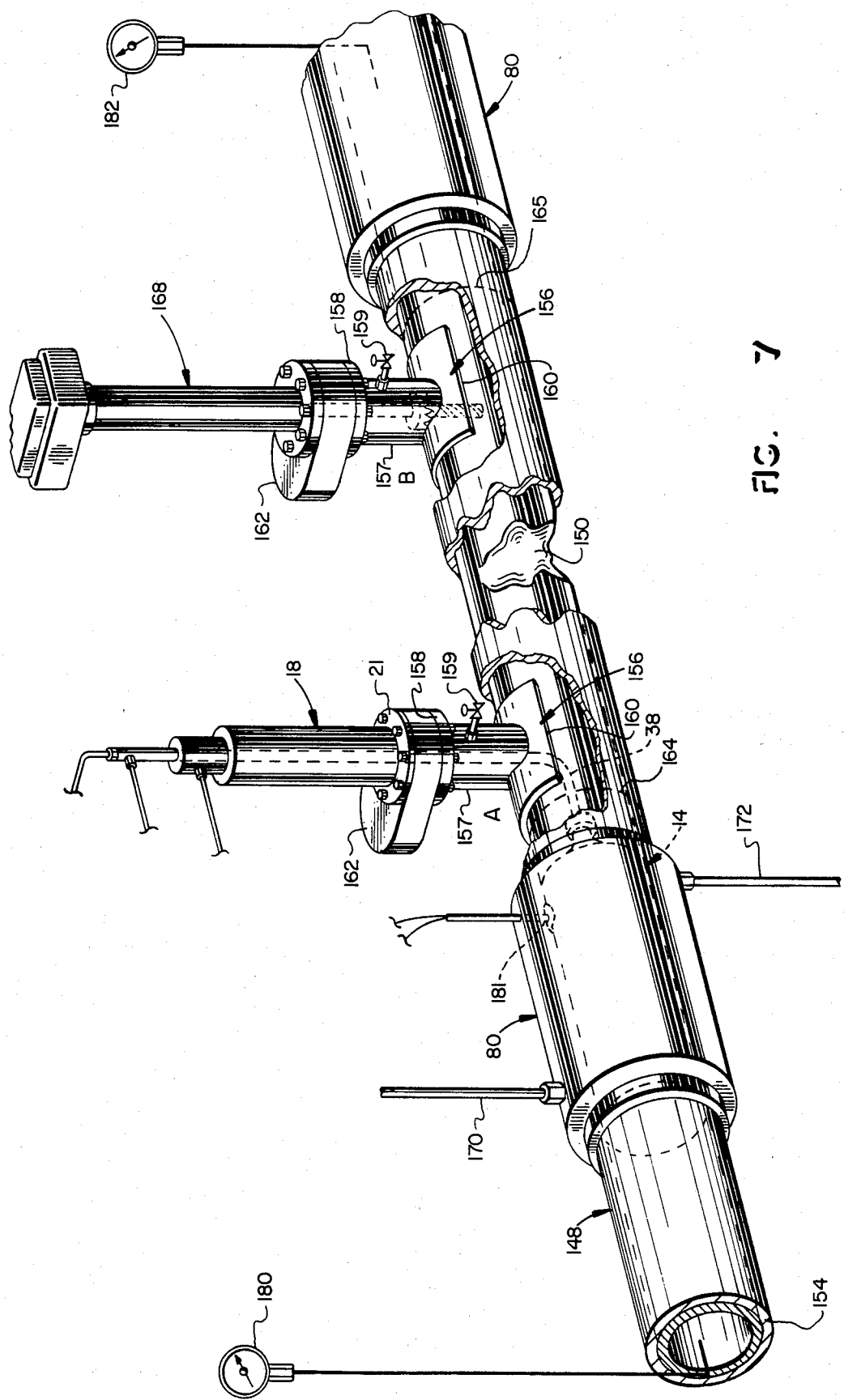

APPARATUS AND METHOD FOR FORMING A TEMPORARY PLUG IN A FLUID CONDUIT

This application is a division of application Ser. No. 328,029, filed Dec. 8, 1981, now U.S. Pat. No. 4,428,204.

BACKGROUND OF THE INVENTION

1. Field of the Invention

The present invention pertains to apparatus and methods for forming a fluid tight plug in fluid conduits such as fluid transmission pipelines wherein a relatively small diameter hole is formed in the line and a flexible bag inserted into the line through the hole. The flexible bag is filled with a liquid which is frozen by circulating a cryogenic cooling fluid around the exterior of the line in the vicinity of the bag and/or circulating the cooling fluid through a conduit disposed within the bag.

2. Background Art

The present invention pertains to an improved method and apparatus for providing plugs in conduits such as fluid transmission lines for purposes of installation, repair, modification and hydrostatic testing of the lines. The formation of a temporary substantially fluid tight seal or plug in a fluid transmission line and the like by freezing a slug of liquid within the line is a viable process and one successful method is disclosed in U.S. Pat. No. 3,827,282 issued Aug. 6, 1974 to B. D. Brister. Improved apparatus for carrying out various processes in forming a plug of frozen liquid in a section of a pipeline or the like are disclosed in U.S. Pat. Nos. 4,112,706 and 4,220,012 to Brister.

The aforementioned patents contemplate the formation of a frozen slug of liquid which may be formed using the liquid in the pipeline itself or by injecting a quantity of water into the line and freezing the water slug. However, there are certain instances wherein water cannot be injected into the line because of the possibility of contaminating the pipe and the product carried thereby. Moreover, the condition or particular construction of the line may not permit the injection and transmission of the water slug to the site where the plug is to be formed. There are also, of couse, instances wherein pipelines need the provision of a substantially fluid tight seal to be formed, which pipelines contain a product which cannot be suitably frozen to form a reliable plug in the line.

It is known in the art of providing plugs for pipelines and the like to tap a hole in the side of the line for the insertion of a flexible bag which is filled with a gas such as air to expand the bag into sealing engagement with the inner wall of the pipe to form a seal. However, known techniques for forming pipeline seals with the installation of flexible bags require also that a mechanical stop or abutment be provided since the engagement force between the bag and the pipe wall is not sufficient to hold against high fluid pressures in the line. Moreover, disadvantages of known flexible bag plugging techniques include the requirement of relatively expensive equipment, particularly the need for the mechanical backstop or abutment, as well as the provision of fairly closely spaced multiple holes in the pipeline which tend to weaken the pipe structure and require that additional repair fittings be used. The abovementioned type of pipeline plugging method is not only expensive, as previously mentioned, but it is limited to relatively low pressure applications.

The present invention largely overcomes the problems of providing suitable pipeline plugging means in lines which cannot be filled with water and frozen, or do not contain a fluid which may be suitably frozen to form a plug. The present invention also provides improvements in apparatus and techniques wherein a hole is formed in the pipeline and wherein means are inserted from the exterior of the pipe to form a plug which may then be removed upon completion of the operation for which the plugging was required.

SUMMARY OF THE INVENTION

The present invention provides an improved method and apparatus for providing a temporary plug or seal in a fluid transmission line utilizing the concept of freezing a quantity of liquid to form a plug element having substantial structural strength and forcibly engageable with the inner wall of the pipe to withstand relatively high working pressures within the pipe as well as forming a fluid tight seal.

The present invention also provides an improved method and apparatus for providing a seal plug in a fluid conduit by freezing a quantity of water or other easily frozen liquid wherein the quantity of liquid frozen is relatively small and may be prevented from flowing into the conduit and mixing with the fluid normally present in the conduit.

In accordance with the improved apparatus of the present invention there is provided a flexible bag adapted to be inserted through an opening formed in the side of a fluid transmission line or the like and filled with an easily frozen liquid such as water so that the bag substantially conforms to the inner diameter of the line and when frozen forms a fluid tight seal which is capable of withstanding relatively high pressure from fluid disposed in the line.

The present invention also provides for improved apparatus for forming a plug in a fluid transmission line which is easily insertable from the exterior of the line and requires only one relatively small diameter hole to be tapped in the sidewall of the line.

In accordance with one embodiment of the present invention, there is provided apparatus which is attached to the exterior of a fluid transmission line wherein the line has a hole tapped in the side thereof, which apparatus is adapted to insert a flexible bag into the line and wherein the bag is then filled with an easily freezable liquid such as water to expand the bag into substantial conformity with the inner diameter of the line. Means are provided on the exterior of the line for circulating a cryogenic fluid. Such means are preferably of the type disclosed in U.S. Pat. No. 4,220,012 and characterized by an insulated housing placed around the exterior of the line to define a cooling chamber which is filled with a cryogenic fluid such as liquid nitrogen.

The method and apparatus of the present invention further contemplates the provision of means for thawing the ice within the flexible bag in an accelerated manner by injecting a fluid such as steam through conduit means used to fill the bag with the freezable liquid. In an alternate embodiment in accordance with the present invention, there is provided a flexible bag which may be inserted within a fluid transmission line and which includes a conduit system connected thereto providing for filling of the bag with water or other freezable liquid as well as the circulation of a cryogenic fluid through a coil or closed conduit within the interior of the bag to accelerate the freezing process. The conduit system also provides for circulation of a thawing fluid for accelerating melting of the frozen contents of the bag when it is desired to remove the plug from the line.

Further in accordance with the present invention, there is provided an improved method for providing one or more temporary plugs in a fluid transmission line or the like which plugs may be inserted at specific points in the line without the necessity of transporting either a liquid to be frozen or an isolating pig device or the like to the exact location where the plug is to be formed. The improved method for forming a frozen plug in a fluid transmission line in accordance with the present invention also provides for forming a plug wherein the liquid which is frozen does not come into contact with the interior of the line or the line fluid and which liquid may be removed together with a container therefore through an opening in the wall of the transmission line through which the container is inserted to form the plug.

Those skilled in the art will appreciate from the foregoing, as well as the detailed description which follows, the many advantages and superior features of the present invention. Although the present invention is advantageously used in conjunction with relatively large diameter liquid and gas transmission pipelines, those skilled in the art will appreciate that virtually any type of closed, generally cylindrical conduit may be plugged using the apparatus and method disclosed and claimed herein.

BRIEF DESCRIPTION OF THE DRAWINGS

FIG. 1 is a longitudinal section view of a conduit comprising a portion of a fluid transmission pipeline showing the plug forming apparatus of the present invention disposed in the working position;

FIG. 2 is a detail view illustrating a portion of the conduit system for conducting the liquid to be frozen into the bag and for injecting a thawing fluid;

FIG. 3 is a detail section view of another portion of the conduit system of the embodiment illustrated in FIGS. 1 and 2;

FIG. 7 is a perspective view illustrating the repair of a fluid transmission line in accordance with the present invention.

DETAILED DESCRIPTION OF THE PREFERRED EMBODIMENTS

Figure 4:
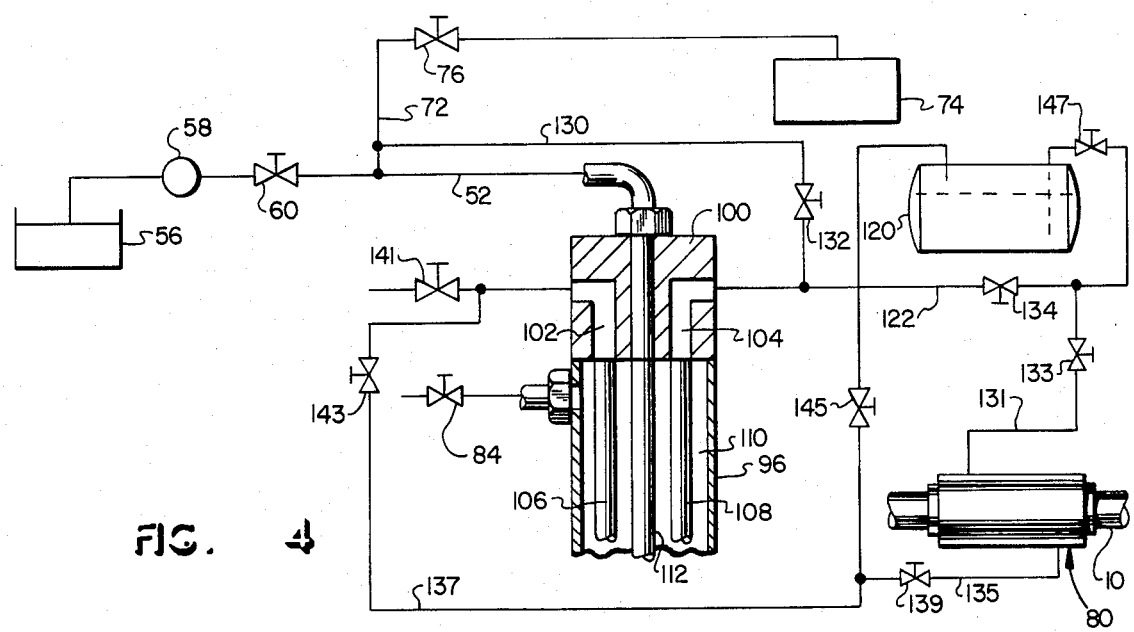
FIG. 4 is a detail section view of a conduit system in accordance with an alternate embodiment of the present invention.

In the description which follows, like parts are marked throughout the specification and drawings with the same reference numerals, respectively.

Referring now to the drawings, apparatus in accordance with the present invention is illustrated in a vertical longitudinal central section view in accordance with FIG. 1. Referring to FIG. 1, there is illustrated a portion of a cylindrical fluid transmission pipeline, generally designated by the numeral 10. The pipeline 10 may be adapted for transporting virtually any type of liquid or gaseous fluid and may be of various diameters in the range of anywhere from 4 inches to 48 inches and up. A typical example of a pipeline with which the present invention is adapted to be used may be a line for transporting crude or refined liquid petroleum products and may extend several hundred miles. The normal operating pressures of a system of which the pipeline 10 could be a part might range from 20 to 1500 pounds per square inch gauge.

It might, on various occasions, be necessary to repair or replace a section of pipe in the pipeline 10, provide for installing a particular fitting or a branch conduit to the line, or perform hydrostatic testing during construction or after repair of the line. The location of the section to be plugged, for whatever purpose, may not permit the use of the method and apparatus described and claimed in the aforementioned patents wherein a slug of water is conveyed through the line to the point of repair and frozen to form a solid, substantially fluid tight plug. Moreover, the type of product being conducted through a line may preclude the formation of a solid plug by freezing the pipeline product itself. However, in accordance with the present invention, a temporary plug may be formed at a precise location by freezing a quantity of liquid which does not become commingled with the pipeline fluid in the line and does not require transportation through the line from a point of insertion which may necessarily be anywhere from a few feet to several miles from the point at which the plug is to be formed.

The method and apparatus of the present invention contemplates the insertion into the interior 12 of the pipe 10 of a flexible fluid tight bag, generally designated by the numeral 14. The bag 14 may be formed of a variety of flexible, fluid impervious materials having sufficient strength to withstand abrasive forces as well as at least moderate pressure forces incurred from the freezing of the contents of the bag. The bag 14 may, for example, be formed of a flexible plastic material or provided with a fluid impervious inner liner made of flexible plastic, not shown in FIG. 1, and disposed within an outer covering formed of a number of panels of sewn fabric such as woven nylon or the like. It is of some importance that the proportions and tailoring of the bag 14 be such that when the bag is filled with liquid it is at least in nominal engagement with the inner wall 16 of the pipe 10. The bag 14 preferably has a nominal length of two to three times its diameter.

The bag 14 may be inserted into the interior 12 of the pipe 10 at a specified location using an insertion apparatus generally designated by the numeral 18 in FIG. 1. The insertion apparatus 18 comprises an elongated cylindrical housing member 20 adapted to be mounted on a collar or saddle member 22 along cooperating flanges 21 and 23, respectively. The member 22 is suitably fixed in the desired position in accordance with known practices which include welding or bolting the member to the exterior of the pipe 10. The apparatus 18 includes a generally cylindrical bag tube 24 which may be provided with cooperating means between the housing 18 and the bag tube to provide for moving the bag tube axially with respect to the housing into the position in FIG. 1 for insertion of the bag 14 into the interior of the pipe 10. The structural details of the bag insertion apparatus 18 may take several forms in accordance with known types of equipment for insertion of flexible bags into fluid conduits. However, by way of example, the apparatus 18 may be a somewhat modified form of a bag insertion apparatus of a type manufactured by ALH Systems Limited of Westbury, Wiltshire, England.

In its collapsed or folded condition, the bag 14 is adapted to be contained within the interior 26 of the bag tube 24 so that, upon installation of the apparatus 18 onto the side of the pipe 10 and after the formation of a suitable hole 28 in the sidewall of the pipe, the bag tube is inserted into the line to the position shown. The bag 14 is then ejected from the tube 24 into the interior of the pipe and guided generally into the position shown in FIG. 1 by a flexible guide finger 30 connected to the open scarfed end 32 of the bag tube.

The bag insertion apparatus 18 also includes an elongated conduit assembly generally designated by the numeral 34 in FIG. 1. The conduit assembly 34 may have an elongated substantially rigid section 36 connected at its lower end to a flexible section 38. Referring also to FIG. 2, the end of the conduit assembly section 38 opposite the end which is connected to the section 36 is secured within a central bore of a generally cylindrical rigid cap member 40 which is sealingly connected to a reduced diameter neck 42 of the bag 14.

Referring now to FIG. 1 and FIG. 3, the upper end of the rigid section 36 of the conduit assembly 34 extends through an end plate 44 of the bag tube 24 and is adapted to be in sealing engagement therewith but slidable with respect thereto. As shown in FIG. 3, the conduit assembly 34 is characterized, with respect to the section 36, by an outer tube member 46 and a concentrically disposed inner tube or conduit 48. Accordingly, a flow passage 50 is formed by the annular space provided between the conduit 46 and the inner conduit 48. The inner conduit 48 is in flow communication with an exterior conduit 52 by way of a suitable fitting 54. It will be appreciated that the arrangement of the upper end of the conduit assembly 34 may take various forms to provide a suitable multiple flow passage arrangement for conducting fluids to and from the conduit section 38. The conduit 52 is adapted to be in communication with a source of liquid to be injected into the bag 14, such as water, contained in a suitable supply tank 56. A pump 58 is adapted to pump water from the tank 56, by way of a shut-off valve 60 through the line 52, and the conduit 48 into the interior of the bag 14 by way of a flexible conduit section 62 generally coaxially disposed within a flexible outer conduit section 64, as shown in FIG. 2. Accordingly, a continuation of the flow passage 50 is formed between the conduit members 62 and 64 and is generally designated by the numeral 66 in FIG. 2. The conduit 62 may be held in spaced relationship within the conduit 64 by suitable spacer elements 70, one shown in FIG. 2.

Referring again to FIG. 3, the supply line 52 leading to the conduit 48-62 is also connected to a source of high temperature fluid such as steam by way of a line 72 connected to a source comprising a boiler or the like 74. An on/off flow control valve 76 is interposed in the line 72 between the line 52 and the source of fluid 74.

Referring again to FIG. 1, the bag 14 is shown in the operative position for forming a substantially fluid tight solid plug to block the interior 12 of the line 10 to prevent the transport of line fluid from one side of the bag 14 to the other. In accordance with the improved method of forming a fluid tight plug it is contemplated that apparatus for freezing the liquid within the interior of the bag 14 may be provided at least in part in accordance with the teachings of U.S. Pat. Nos. 4,112,706 and 4,220,012. As illustrated in FIG. 1, it is contemplated that an insulated housing, generally designated by the numeral 80, be disposed around the exterior of the line 10. The housing 80 defines a cooling chamber 82 formed between the exterior surface of the pipe 10 and the interior of the housing. The chamber 82 is adapted to be filled with a cryogenic fluid such as liquid nitrogen or the like to form a pool around the exterior of the pipe 10. The liquid nitrogen may be agitated by discharging a stream of liquid nitrogen or nitrogen vapor through the pool. Considerable heat exchange occurs as a result of sensible heat transfer directly from the surface of the pipeline as well as the liquid within the bag 14 to the fluid within the chamber 82. Accordingly, the liquid within the bag 14 may be frozen solid in a relatively short period of time to form a temporary plug to block flow through the line 10 for whatever purpose may be required. Details of the apparatus for supplying the cryogenic fluid to the housing 80 may be obtained by referring to the abovementioned patents which are incorporated herein by reference.

In accordance with the improved method of forming a substantial flow stopping plug, the saddle member 22 is secured to the exterior surface of the pipe in the immediate vicinity of the location desired for the plug and a suitable tapping tool is mounted on the saddle member to form a hole in the side of the pipe. Any one of several types of commercially available tapping machines may be utilized to form a hole in the side of the pipe 10 by cutting a cylindrical section out of the pipe to form the opening 28. If the line is filled with fluid at the point of formation of the opening 28, it may also be necessary to provide a so-called sandwich type tapping valve mounted on the saddle member 22. Such a valve is referenced in connection with the procedure described herein in conjunction with FIG. 7 of the drawings.

After the opening 28 is formed, the aforementioned tapping machine is removed and the bag insertion apparatus 18 installed on the saddle member 22. The bag tube 24 is then extended into the interior 12 of the pipe 10 and the bag 14 is ejected from the interior of the tube into generally the position shown in FIG. 1 by suitable means such as the introduction of pressure fluid into the tube interior 26 by way of a suitable conduit 27, for example. A suitable freezable liquid such as water is then conducted through the conduit sections 48 and 62 to fill the bag 14 so that it assumes generally the shape indicated in FIG. 1. Although when the bag 14 is in the collapsed condition within the interior of the tube 24 there is very little air within the bag, the passage 50–66, defined by the conduit sections 36 and 38, respectively, provides for venting any air trapped within the bag through the conduit 84, FIG. 3, so that the bag may be completely filled with liquid.

When the bag 14 has assumed its maximum inflated or filled shape the freezing process may be commenced in accordance with the teachings of the above referenced patents by circulating a cryogenic fluid through the interior of the insulated housing 80 to form an ice plug within the bag. The formation of the plug within the bag 14 expands the bag into substantial tight and sealing engagement with the interior wall surface 16 of the pipe 10. A slight constriction of the pipeline 10 caused by thermal contraction of the pipe material accentuates the forces tending to hold the bag and frozen plug of liquid contained therein in a fixed position even against substantial fluid pressures in the line.

When it is desired to remove the plug, cooling fluid is shut off from circulation through the interior of the insulated housing 80 and the housing may either be removed from the exterior of the pipe 10 or a fluid may be circulated therethrough to heat the bag and the ice plug to melt the ice so that the resulting liquid may be withdrawn through the conduits 62 and/or 64. In accordance with the present invention, it is contemplated that acceleration of the thawing process may be carried out by injection of a heated fluid through the conduit 62 or 64 and withdrawing the melted liquid together with the heating fluid through the other of the conduits. As shown in FIG. 3, a heating fluid such as steam may be introduced into the conduits 48 and 62 by way of the line 72 and 52 by closing the valve 60 and opening the valve 76. As steam is ejected from the output end of the conduit 62, it commences to melt the ice plug contained within the bag 14 and the resulting liquid, including the condensed steam, may be withdrawn through the passage 66–50 and discharge line 84. A pump may be provided in the line 84, not shown in FIG. 3, or the injection pressure of the heating fluid may be sufficient to remove at least some of the liquid from the interior of the bag 14. As soon as a sufficient quantity of liquid is removed from the bag 14 to permit its withdrawal up into the interior 26 of the bag tube, the apparatus 18 may then be removed from the pipe 10 and a suitable plug inserted in the bore 25 of the saddle member 22 to restore the pipe to a working condition.

Those skilled in the art will appreciate that any number of temporary plugs in accordance with the foregoing description may be inserted in a conduit such as the pipe 10 and spaced apart from each other to block off a section of conduit for replacement, repair, pressure testing, or the insertion of various types of fittings as required.

Figure 5:
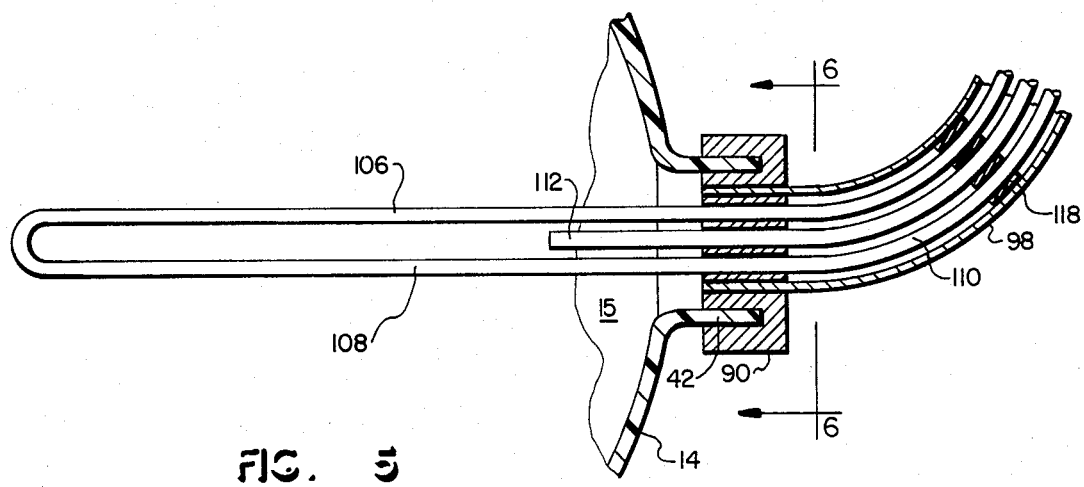
FIG. 5 is a detail section view of another portion of the conduit system of FIG. 4 at the inlet to the flexible bag.
Figure 6:
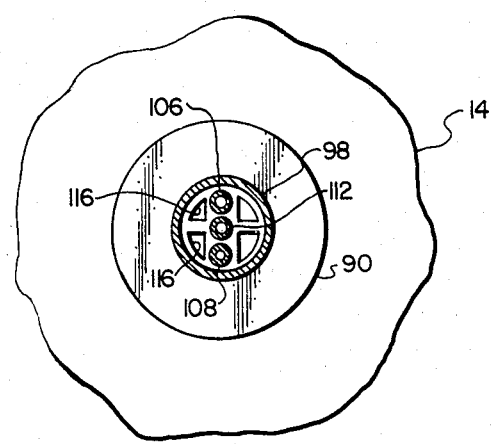
FIG. 6 is a transverse section view taken from the line 6—6 of FIG. 5.

Referring now to FIGS. 4, 5 and 6 of the drawings, an alternate embodiment of the present invention is illustrated and pertains primarily to a modification of the conduit system for conducting fluid into the interior 15 of the bag 14. A portion of the bag 14 is illustrated in FIGS. 5 and 6, including the neck 42 which is inserted in a modified cap or head member 90. In the arrangement according to the embodiment of the invention illustrated in FIGS. 4, 5 and 6, the conduit sections 36 and 38 are replaced by respective rigid and flexible conduit sections 96 and 98. Referring particularly to FIG. 4, the upper end of the conduit section 96 includes a head portion 100 having respective passageways 102 and 104 which are in communication, respectively, with elongated conduits 106 and 108 extending longitudinally within the interior 110 of the conduit section 96. The conduits 106 and 108 extend through the conduit section 98 and into the bag interior 15 and are conjoined to form a closed loop or continuous conduit within the bag interior, as shown in FIG. 5. As shown in FIGS. 4 and 5, a coaxially disposed conduit 112 also extends from the head 100 down through the conduit assemblies 96 and 98 and through the cap or head 90 into the interior 15 of the bag 14. The conduit 112 is adapted to be in communication with a source of freezable liquid, such as water, from the tank 56 in substantially the same arrangement as the conduit 48 for the embodiment shown in FIGS. 1, 2 and 3. The interior passageway 110 is also adapted to be in flow communication with the interior 15 of the bag and with the discharge line 84 in the same manner that the interior passageways 50–66 are arranged in accordance with the embodiment illustrated in FIGS. 1 through 3. As shown in FIG. 6, the head 90 includes a plurality of passageways 116 formed therein to permit communication of the interior flow passage 110 with the interior 15 of the bag. As shown in FIG. 5, one or more additional conduit support members or spacers 118 may be positioned along the interior of the outer conduit 98 for supporting the respective conduits 106, 108 and 112. The spacers 118 are also configured in the same manner as the head 90 to have flow passageways formed therein to permit flow of fluid through the interior passageway 110.

The function of the conduit 112 and the interior flow passageway 110 is the same as the arrangement previously described in conjunction with FIGS. 1 through 3 of the drawings. However, as illustrated in FIG. 4, the conduit loop 108–106 is adapted to be in communication with a source of cryogenic fluid from a tank 120 by way of flow line 122. The conduit 108 may also, as illustrated in FIG. 4, be in communication with the heated fluid flow line 72 by way of a connecting conduit 130. Suitable valves 132 and 134 are provided in the respective lines 130 and 122 for controlling the flow of fluids to the conduit 108.

The system illustrated in FIG. 4 is arranged to provide for circulating cryogenic fluid from the tank 120 to the housing 80 and through the conduit loop 108–106. As illustrated somewhat schematically in FIG. 4, the chamber 82 of the housing 80 is connected to the tank 120 by way of a supply conduit 131 connected to the conduit 122 and having a suitable control valve 133 interposed therein. A return line 135 is also interconnected between the chamber 82 of the housing 80 and the tank 120. A cryogenic fluid return line 137 is connected to the conduit 106. Control valves 139 and 143 are provided, which together with the valves 133 and 134, are operable to adjust the flow of fluid to and from the tank 120. The flow circuit described may include suitable pumps and compressors for handling the cryogenic fluid flow to and from the tank 120. However, these components have been eliminated from the circuit schematic of FIG. 4 in the interest of conciseness. Suffice it to say that cryogenic fluid flows out of the tank 120 through valve 147 and lines 122 and 131, and fluid flows back to the tank by way of lines 135, 137 and valves 139 and 145.

When the system of FIG. 4 is operated to circulate cryogenic fluid from the tank 120 through the housing 80 and the conduit circuit 108–106, valves 76, 141 and 132 are closed and valves 133, 134, 139 and 143 are adjusted to control the flow of cryogenic fluid to and from the tank 120 through the respective circuits. When the thawing process is commenced, the valves 60, 134, 143 and 147 are closed and valves 76, 84, 132 and 141 are opened to circulate heated fluid through the conduits 108–106 as well as the conduit circuit 112–110. It is also contemplated that during the thawing process valve 145 could be closed while leaving valves 134, 133, 139 and 143 in controlled open positions to circulate heated fluid through the chamber 82 of the housing 80 to accelerate the plug thawing process.

Accordingly, the embodiment of the present invention illustrated in the drawing FIGS. 4 through 6 provides additional freezing capability by circulating cryogenic fluid, such as liquid nitrogen, through the conduit 108–106 to provide freezing of the liquid within the interior 15 of the bag once the bag has been filled. The conduit 108–106 may be of a flexible plastic which could be partially collapsed or wound in a roll in the folded or collapsed condition of the bag 14. Once the bag has been ejected from the insertion apparatus 18 and deployed in the general position illustrated in FIG. 1, the conduit assembly 108–106 could be pressurized with cryogenic fluid to be unrolled into the position illustrated in FIG. 5. The circulation of cryogenic fluid through the conduit 108-106 together with the cooling and freezing effect provided by the housing 80 makes it possible to freeze the plug more rapidly than might be accomplished by circulating the cryogenic fluid through the interior of the housing only. Moreover, in the thawing process, it is contemplated that the melting of the ice plug within the bag 14 could be accelerated as described above by injecting heated fluid such as steam through the conduits 108-106 coincidentally with conduction of the heating fluid through the conduit 112.

As will be appreciated from the foregoing discussion in conjunction with FIG. 1 and 6 of the drawings, the present invention provides an improved method and apparatus for forming a temporary, substantially flow stopping plug in a fluid conduit such as a liquid or gas transmission line. In many applications of fluid transmission lines, it is important that, in order to repair, test, or install new fittings in the line, the fluid already present in the line not be permitted to escape for ecological and/or economic reasons. An improved method for repairing a section of a conduit such as a fluid transmission line under such circumstances will now be described in detail in conjunction with FIG. 7 of the drawings.

Referring to FIG. 7, there is illustrated a section of a fluid transmission line 148 that may, for example, be deployed underwater and damaged at a section 150 by a vessel having dragged its anchor over the line. The transmission line illustrated in FIG. 7 typically includes a protective coating, generally designated by the numeral 154, and comprising a corrosion resistant coating and a layer of concrete, for example. In providing for replacing the section 150 of the line 148 it may be impossible, and is normally inconvenient, to unload the contents of the line prior to making the repair since such an operation may require pumping the contents out of a length of line extending several miles. In any case, it is usually much more convenient to be able to repair the line without allowing a substantial quantity of fluid to either flow into or out of the line. It may also be very important to prevent loss of the line contents into the surrounding environment at the point of repair.

In carrying out the repair operation for the section of the line 148, the outer coating 154 would be removed at a predetermined location on each side of the damaged section 150, and fittings 156 similar to the saddle member 22 would be installed on the line as by welding or bolting thereto. The fittings 156 each comprise a hollow cylindrical pipe portion 157 having a generally cylindrical flange 158 at one end and a saddle or flange portion 160 at the opposite end conforming to the shape of the pipeline 148. The fittings 156 are each adapted to receive a valve assembly 162, commonly referred to as a sandwich type tapping valve and which may be of a type commercially available. One source of such a valve is T. D. Williamson, Inc., Tulsa, Oklahoma. The valve 162 is basically a gate type and is installed on each of the fittings 156, as shown in FIG. 7.

In FIG. 7, a tapping machine has already been installed on the valve 162 at location A, a hole formed in the line and the tapping machine removed so that the bag insertion apparatus 18 can be installed thereon, as shown. A bag 14 is shown deployed within the interior of the line 148 and positioned to the left of the dashed line 164, as indicated in FIG. 7. FIG. 7 also illustrates that a housing 80 has been installed on the line 148 surrounding the area in which the bag 14 is disposed. It is contemplated that the conduit section 38 may be provided sufficiently long enough that the bag 14, under the urging of pressure fluid injected into the interior 26 of the tube 24, may be forced into a position approximately 3 to 4 feet to the left of the centerline of the hole formed in the wall of the line 148 at position A. Accordingly, in FIG. 7, a first plug has already been installed and a tapping machine of the type referred to hereinabove and generally designated by the numeral 168 is illustrated as being mounted on the valve 162 at location B for tapping a hole prior to insertion of a second bag 14, not shown, using also an insertion apparatus of the type disclosed herein. The tapping machine 168 may be of a type available commercially from the source mentioned herein for the valve 162.

A preferred method of repairing a section of pipe or conduit such as the line 148, illustrated in FIG. 7, will now be described. The line section to be repaired as indicated above may require, if deployed underwater, to be anchored on each side of the damaged section to prevent any vertical or horizontal movement during the repair operation. The line 148 may also require the removal of the protective coatings at the locations of installations of the fittings 156 and the housings 80. After carrying out these steps, if necessary, the fittings 156 are installed at the positions A and B, as indicated. Each of the fittings 156 includes a tapping valve 162 mounted on its flange 158, as shown. Prior to drilling a hole in the line 148 at the position A, the tapping machine 168 is installed on the upward facing flange of the valve 162 and the valve is opened so that the pilot bit and cutter head of the tapping machine can be advanced against the pipe to form a hole in the sidewall thereof, preferably by cutting a cylindrical shaped piece from the pipe and removing said piece with the cutter head of the tapping machine in a known manner.

After cutting the aforementioned hole in the line 148, the tapping machine cutter and pilot bit are retracted through the valve 162 and the valve is then closed prior to removal of the tapping machine from the valve. After removal of the tapping machine, the bag insertion apparatus 18 is mounted on the flange of the valve 162. Prior to reopening the valve 162, it may be necessary to bleed pressure fluid from the fitting 156 through a suitable bleed valve 159 which is in communication with the interior of the cylindrical pipe portion 157 of the fitting. After the bag insertion apparatus 18 is installed on the valve 162 and the valve is bled, if necessary, the valve 162 is reopened and the bag insertion tube 24 is inserted through the hole formed in the sidewall of the line 148 wherein the bag contained within the tube is then deployed in the direction indicated away from the damaged section 150. After deployment of the bag 14, it is filled with a freezable liquid such as water, for example, under pressure at least equal to the pressure of the fluid within the line and preferably slightly greater than line pressure, on the order of 5 to 10 pounds per square inch, so that the bag may be firmly positioned in the predetermined location. A second bag 14 is then deployed at position B beyond the point indicated by the dashed line 165 by carrying out the steps described hereinabove with respect to the deployment of the bag at position A.

After installation of the housings 80 around the line 148 at the positions of both bags, respectively, and as indicated in FIG. 7, the interior chambers 82 of the housings are purged with a fluid such as air, for example, particularly if the housings have been deployed on the line in an undersea environment. The purging of the housing chambers 82 may be carried out using the cryogenic fluid supply and return lines 170 and 172 which are connected to the housings 80, as shown by way of example in FIG. 7, and to a source of fluid such as the tank 120 shown in FIG. 4. After purging of the chambers of the housings 80, the freezing operation is commenced by supplying the cryogenic fluid to the respective housings. If the system illustrated in FIGS. 4, 5 and 6 of the drawings is used, cryogenic fluid may also be circulated through the interior of the bags to accelerate the freezing process.

The present invention also contemplates monitoring the temperature of the pipe surface in the vicinity of the freezing operation using the temperature sensor 181, shown by way of example in FIG. 7, and adjusting the flow of liquid nitrogen to the interior chambers of the housings 80 to maintain, for example, a temperature on the exterior pipe surface of the −320° F. In a subsea environment and in the repair of a line of a nominal diameter of 24 inches, for example, it is contemplated that the time to complete the freezing of two plugs would be approximately 14 hours or less. When the plugs are thought to be completely formed, a test for completion of the plug formation may be made by bleeding pressure from one or the other fittings 156 and measuring the change in fluid pressure at gauges 180 and 182, indicated schematically in FIG. 7, on either side of the plugged off section of line. The gauges 180 and 182 may be located at pumping stations disposed on either side of the section 150, for example.

When the plugs are completely formed and a steady state has been achieved with respect to the maintenance of cryogenic fluid circulation through each housing 80, the pipe section 150 may be removed between the dashed lines 164 and 165 and a new section of line installed therebetween. As will be appreciated from the foregoing, the process described contemplates that the conduits 38 leading to each bag 14 are served when the pipe section is cut and the respective spaced apart fittings 156 together with the bag insertion apparatus mounted thereon are removed with the damaged section of line.

A new section of line is then installed in accordance with one or more known techniques and upon completion of installation the monitoring of the freezing of the plugs may be ceased and the housings 80 removed to allow the plugs to thaw due to the temperature difference of the surrounding environment. Alternatively, a heated fluid may be circulated through the housings 80 to accelerate the thawing process. Once the plugs have been thawed and the bags released they are carried with line product to a filtering or trap point in the line for removal therefrom or, if the bags are degradable by line product and the liquid contained within the bags may be allowed to be mixed with line product, no special treatment for removal of the bags is necessary.

Alternatively, if it is not permissible to leave the bags and the liquid contained therein within the line after repair of the damaged section, the locations of the bags are required to be such that the damaged section is cut between the two fittings 156 and the plugs are removed in accordance with the description hereinabove wherein the liquid within the bags is pumped out of the bags and the bags are retracted into the insertion apparatus. After removal of the bags by the respective insertion apparatus 18 the valves 162 would be closed and the bag insertion apparatus unbolted from each valve, respectively. Repair or plugging of the holes formed in the sidewall of the pipeline 148 within the fittings 156 would then be carried out in accordance with known techniques, if necessary, or the valves 162 would merely be left on the line in their closed positions.

Those skilled in the art will appreciate from the foregoing that the improved method and apparatus of the present invention may be carried out in subterranean or subsea environments as well as surface locations of fluid transmission lines. Typical equipment for carrying out the line repair section described hereinabove in connection with FIG. 7 of the drawings would include sufficient liquid nitrogen tankage to hold an estimated 6,000 U.S. gallons plus additional capacity or replenishment capability of approximately 2 gallons per minute of freeze holding time. Cryogenic fluid supply lines 170 and 172 would normally be of at least one inch diameter. Suitable temperature monitoring equipment for measuring the pipe surface temperature would also be required. The tapping machine 168 would typically be of a hydraulic/pneumatic powered type suitable for subsea service if necessary. Of course, at least two bag insertion apparatus 18 would be required, complete with one bag for each apparatus, and two housings 80 would be required to carry out the method described hereinabove. However, various modifications and substitutions may be made in the foregoing described method and apparatus without departing from the scope of the present invention defined in the appended claims.

What is claimed is:

1. Apparatus for forming a substantially flow stopping plug in a conduit such as a fluid transmission line comprising:
   a flexible bag formed of a substantially liquid impervious material;
   conduit means connected at one end to said bag and adapted to be connected at the other end to a source of liquid for filling said bag with liquid when said bag is in a deployed position in the interior of said line; means extending into the interior of said bag for conducting fluid in heat exchange relationship with liquid in the interior of said bag; and
   bag holding means for holding said bag in a collapsed condition, said bag holding means being operable to be connected to said line, said bag holding means including means for ejecting said bag from said bag holding means into said interior of said line whereby said bag may be filled with said liquid to be frozen to form said plug.

2. The apparatus set forth in claim 1 wherein:
   said conduit means includes a first conduit for conducting fluid to the interior of said bag; and
   a second conduit for conducting liquid out of said bag.

3. The apparatus set forth in claim 2 wherein:
   said apparatus includes a source of heated fluid adapted to be connected to one of said conduits for injection of a quantity of said fluid into said bag.

4. The apparatus set forth in claim 2 wherein:
   said means extending into the matter of said bag comprises a third conduit formed to extend into the interior of said bag, said third conduit being connected to a source of cryogenic fluid wherein said cryogenic fluid may be injected into said third conduit to at least assist in freezing said liquid in said bag.

5. The apparatus set forth in claim 4 wherein:
said third conduit includes tube means connected at one end to said source of cryogenic fluid and running through the interior of said bag and out of said bag to a point exterior of said line.

6. The apparatus set forth in claim 4 wherein:
said apparatus includes means for connecting said source of heated fluid to said third conduit for circulating said heated fluid through the interior of said bag to melt said plug.

7. The apparatus set forth in claim 1 wherein:
said bag is proportioned to be expandable into forcible engagement with the interior wall surface of said line in response to the expansion of said liquid when frozen.

8. In a system for forming a temporary plug in a conduit such as a fluid transmission line the combination comprising:
a flexible container insertable into the interior of said transmission line in a substantially collapsed condition, said container being formed to be filled with liquid to become engaged with the interior wall of said transmission line;
first conduit means connected to said container and to a source of freezable liquid for conducting said liquid to said container;
a source of cryogenic fluid;
means in heat exchange relationship with liquid in said container for circulating cryogenic fluid from said source to extract heat from liquid in said container to form a frozen plug in said container for substantially stopping flow of fluid through said transmission line; and
second conduit means interconnecting said source of cryogenic fluid with said means for circulating.

9. The combination set forth in claim 8 together with:
a source of heated fluid;
third conduit means interconnecting said source of heated fluid and said first conduit means for conducting heated fluid to said container to melt said frozen plug.

10. The combination set forth in claim 9 wherein:
said first conduit means comprises a supply conduit leading to the interior of said container and a return conduit in communication with the interior of said container for conducting fluid out of said container.

11. The combination set forth in claim 9 wherein:
said system includes fourth conduit means interconnecting said source of heated fluid with said means in heat exchange relationship with said liquid in said container for melting said frozen plug of said liquid.

12. The combination set forth in claim 11 wherein:
said means in heat exchange relationship with said liquid includes fifth conduit means extending into the interior of said container.

13. The combination set forth in claim 11 or 12 wherein:
said means in heat exchange relationship with said liquid in said container comprises a housing disposed around the exterior of said transmission line and forming a chamber for said cryogenic fluid.

14. The combination set forth in claim 13 wherein:
said fifth conduit means forms a closed loop in communication with said source of cryogenic fluid, and said system includes sixth conduit means connected to said fifth conduit means downstream of said container in the normal flow direction of fluid through said fifth conduit means, and said system further includes valve means for selectively connecting said fifth conduit means to said source of cryogenic fluid and to said source of heated fluid.

* * * * *